United States Patent
Peterson et al.

(10) Patent No.: US 9,631,735 B2
(45) Date of Patent: Apr. 25, 2017

(54) INTEGRATION OF MAGNET IN SOLENOID VENT PATH

(71) Applicant: FLEXTRONICS AP, LLC, Broomfield, CO (US)

(72) Inventors: Matthew Peterson, Ada, MI (US); Hamid Najmolhoda, Grand Rapids, MI (US)

(73) Assignee: Flextronics AP, LLC, San Jose, CA (US)

( * ) Notice: Subject to any disclaimer, the term of this patent is extended or adjusted under 35 U.S.C. 154(b) by 158 days.

(21) Appl. No.: 14/542,861

(22) Filed: Nov. 17, 2014

(65) Prior Publication Data

US 2016/0136655 A1 May 19, 2016

(51) Int. Cl.
| | |
|---|---|
| *F16K 31/06* | (2006.01) |
| *B03C 1/033* | (2006.01) |
| *B03C 1/28* | (2006.01) |
| *H01F 7/08* | (2006.01) |
| *F16K 31/02* | (2006.01) |

(52) U.S. Cl.
CPC ........ *F16K 31/0644* (2013.01); *B03C 1/0332* (2013.01); *B03C 1/286* (2013.01); *B03C 1/288* (2013.01); *F16K 31/0675* (2013.01); *B03C 2201/18* (2013.01); *F16K 31/02* (2013.01); *H01F 7/08* (2013.01)

(58) Field of Classification Search
CPC .. B03C 1/02; B03C 1/28; B03C 1/288; B03C 1/30; B03C 2201/18; B03C 2201/20; B03C 2201/30; F16K 31/0644; F16K 31/0668; F16K 31/122; F16K 31/02; H01F 7/08

USPC ............ 310/12.24, 14, 216.074; 251/129.15; 335/220, 251, 255, 281, 85
See application file for complete search history.

(56) References Cited

U.S. PATENT DOCUMENTS

| | | | | |
|---|---|---|---|---|
| 4,783,049 | A | * 11/1988 | Northman | ........... F16H 61/0009 137/625.65 |
| 4,988,074 | A | * 1/1991 | Najmolhoda | ...... G05D 16/2013 251/129.08 |
| 6,581,634 | B2 | 6/2003 | Najmolhoda et al. | |
| 7,673,597 | B2 | 3/2010 | Najmolhoda et al. | |
| 2002/0162594 | A1* | 11/2002 | Najmolhoda | ....... F16K 31/0613 137/625.65 |
| 2007/0138422 | A1* | 6/2007 | Najmolhoda | ......... F16K 31/062 251/129.14 |

(Continued)

FOREIGN PATENT DOCUMENTS

EP 1795791 A1 6/2007

*Primary Examiner* — Krishnan S Menon
*Assistant Examiner* — Liam Royce
(74) *Attorney, Agent, or Firm* — Volpe and Koenig, P.C.

(57) ABSTRACT

Electrohydraulic solenoids with improved filtering of venting fluid are provided herein. In some embodiments, an electrohydraulic solenoid comprises a hollow cylindrical bobbin having a flange at a first end with a core having a cavity open at one end disposed in the hollow of the bobbin. An armature is disposed within the cavity and supported for axial movement within the cavity. A portion of a pole piece is disposed in the hollow of the bobbin at the first end with an axial face of the portion abutting the open end of the cavity and a shoulder axially spaced from the flange forming a gap. A vent path is formed between the cavity and an outer environment, the vent path comprising at least a portion of the gap, with a magnet disposed in a portion of the vent path.

5 Claims, 2 Drawing Sheets

(56) References Cited

U.S. PATENT DOCUMENTS

2014/0175312 A1* 6/2014 Jamison .................... F16K 1/34
251/129.15

* cited by examiner

INTEGRATION OF MAGNET IN SOLENOID VENT PATH

FIELD OF INVENTION

Embodiments of the present disclosure generally relate to electrohydraulic solenoid valves.

BACKGROUND

Some electrohydraulic solenoids, for example those used in automotive systems, utilize tight running fits between the ferromagnetic core and the armature. In order to optimize response time, the core cavity in which the armature moves is sometimes vented to the surrounding environment. The surrounding environment may be an oil environment, and the venting fluid may be oil. Open communication between the core cavity and the environment may introduce environmental contaminants contained in the oil, such as ferrous particles, to the internal passageways of the electrohydraulic solenoid. The contaminants may build up forming a magnetic sludge that can inhibit armature movement.

Some conventional electrohydraulic solenoids rely on upstream filtering of the venting fluid, and may include filter screens in hydraulic sections of the solenoid. Conventional filtering has been shown to be insufficient as solenoid sensitivity to contaminants increases.

Accordingly, a need exists for a solenoid with a vent path having improved filtering capabilities.

SUMMARY

Embodiments of electrohydraulic solenoids with improved filtering of venting fluid are provided herein. In some embodiments, an electrohydraulic solenoid comprises a hollow cylindrical bobbin having a flange at a first end with a core having a cavity open at one end disposed in the hollow of the bobbin. An armature is disposed within the cavity and supported for axial movement within the cavity. A portion of a pole piece is disposed in the hollow of the bobbin at the first end with an axial face of the portion abutting the open end of the cavity and a shoulder axially spaced from the flange forming a gap. A vent path is formed between the cavity and an outer environment, the vent path comprising at least a portion of the gap, with a magnet disposed in a portion of the vent path.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
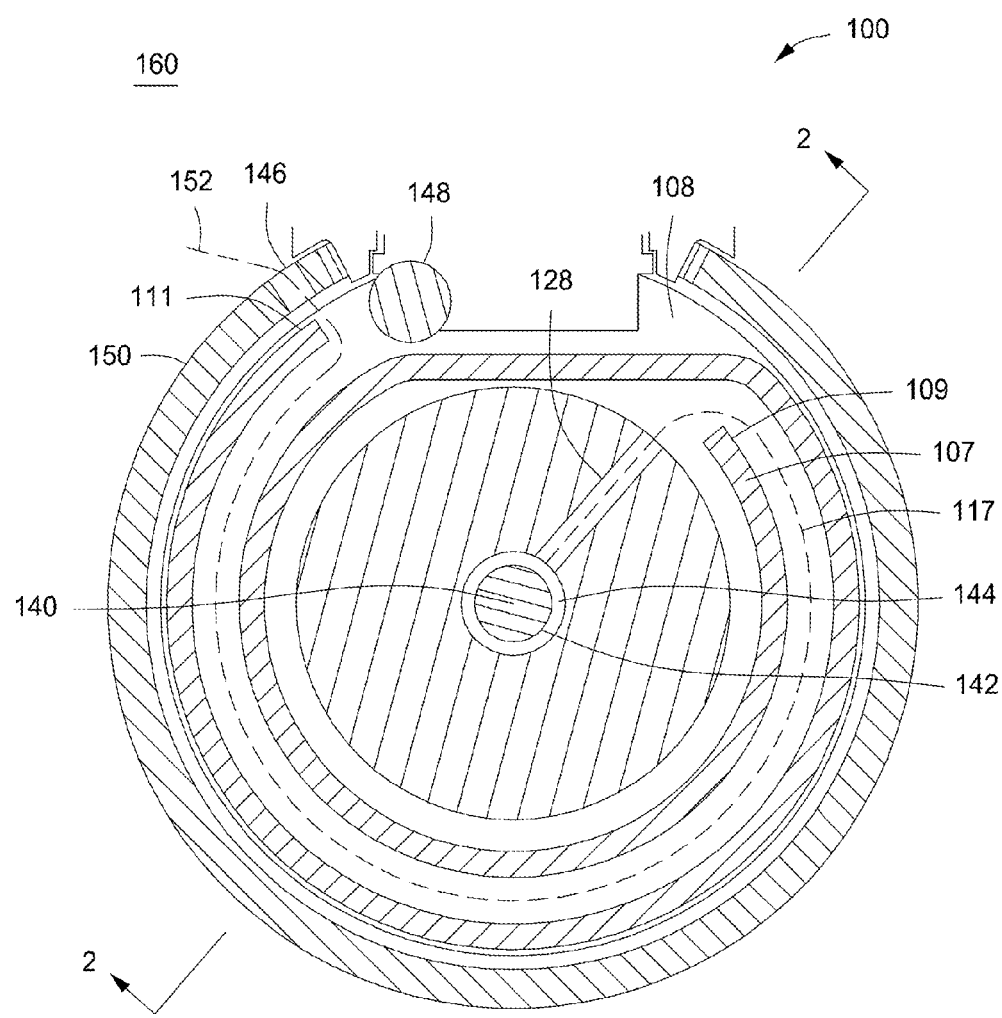
FIG. 1 is an end sectional view of a electrohydraulic solenoid in accordance with an embodiment of this disclosure.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to an automotive system, the present invention may be modified for a variety of applications while remaining within the spirit and scope of the claimed invention, since the range of the potential applications is great, and because it is intended that the present invention be adaptable to many such variations.

DETAILED DESCRIPTION

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. The terminology includes the words specifically noted above, derivatives thereof and words of similar import.

Figure 2:
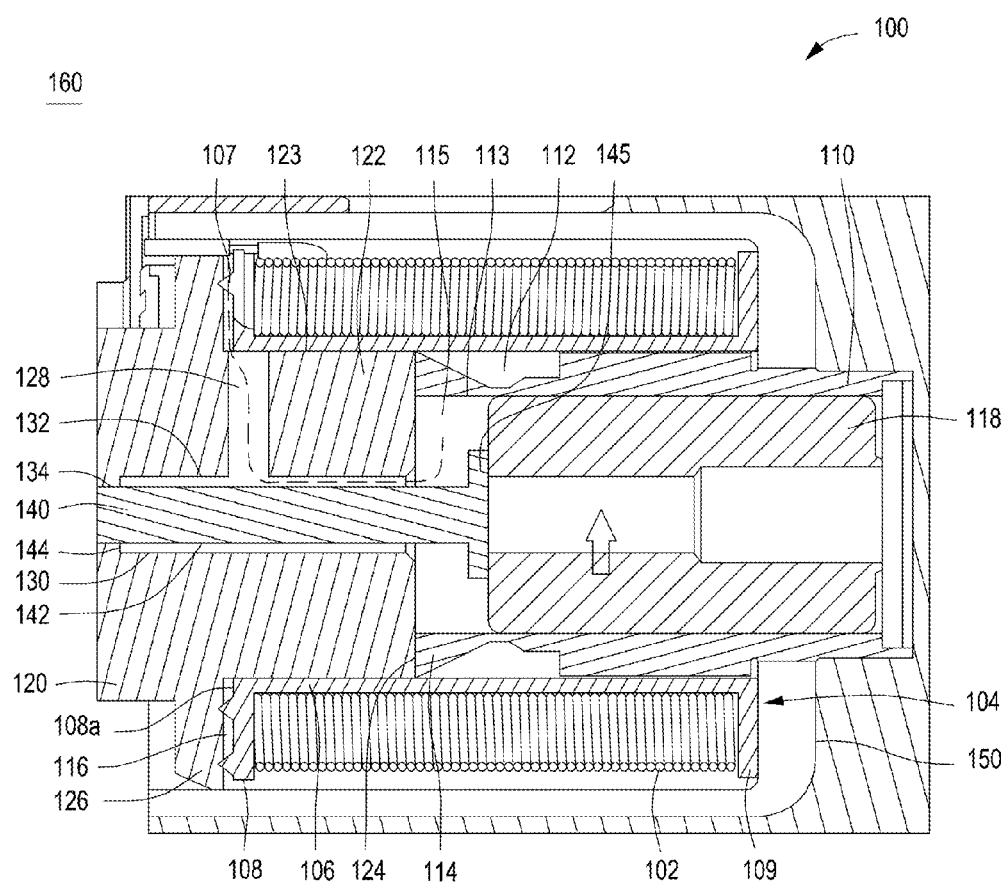
FIG. 2 is a side sectional view of the solenoid of FIG. 1 taken along line II-II.

FIGS. 1 and 2 depict an electrohydraulic solenoid, solenoid 100, in accordance with an embodiment of the present disclosure. The solenoid 100 comprises a magnetic coil 102 helically wound around a center portion 106 of a hollow cylindrical bobbin 104 between a first end flange 108 and a second end flange 109. A projection or rib 107 is formed on the axially outward face 108a of the first end flange 108.

The solenoid 100 includes a core 110 coaxially aligned with the bobbin 104 and disposed at least partially in the hollow 112 of the bobbin 104. The core 110 includes an inner wall 113 defining a cavity 115 open at a first end 114.

An armature 118 is coaxially aligned with the core 110 and is supported for linear axial displacement within the core 110 when the coil 102 is energized.

As illustrated in FIG. 2, the solenoid 100 includes a pole piece 120 including a portion 122 extending at least partially into the hollow 112 of the bobbin 104. An axial face 124 of the portion 122 is in an abutting relationship with the first end 114 of the core 110. The pole piece 120 includes a radially extending shoulder 126 adjacent to and abutting the rib 107 to maintain a gap 116 between the first end flange 108 and the shoulder 126.

As illustrated in the non-limiting embodiment of FIG. 1, the rib 107 is a spiral projection with a first end 109 adjacent to the hollow 112 of the bobbin 106 and radially expanding to a second end 111. The rib 107 creates a gap 116, preferably a tortuous path 117, from the first end 109 to the second end 111. Although the tortuous path 117 is illustrated as a circular spiral path, any shaped path with changes in direction, such as turns, may be used.

The pole piece 120 includes a centrally located bore 130 having a first diameter 132 adjacent to the axial face 124 disposed in the hollow 112 and extending at least partially through the pole piece, and a second diameter 134, smaller than the first, at an opposite end. The pole piece 120 includes a passage 128 in fluid communication with the gap 116 and in fluid communication with the cavity 115. As illustrated in FIG. 2, a first end of the passage 128 is adjacent to the first diameter portion 132 of the bore 130 and in fluid communication with the cavity 115. As second end of the passage 128 terminates at an outer diameter 123 of the portion 122 that extends into the hollow 112 so that the passage 128 is in fluid communication with the path 117.

A pin 140 having a uniform diameter stem 142 and a first end 145 is disposed in the bore 130. The stem 142 passes through the first diameter 132 of the bore 130 with clearance 144 and is supported for axial displacement by the second diameter 134. The first end 145 may have a larger diameter than the stem 142. The first end 145 extends into the cavity 115 to abut the armature 118. The clearance 144 provides fluid communication between the passage 128 and the cavity 115.

As illustrated in FIGS. 1 and 2, a vent path 152 (shown as a dotted line) is maintained from the cavity 115 through the clearance 144 in the pole piece 120, the gap 116, the exit 146 formed on the case 150, and to the surrounding environment 160. A venting fluid, for example oil, may flow bidirectionally in the vent path 152. For example, as the armature 118 moves to the left as drawn in FIG. 2, the cavity 115 decreases in volume and the venting fluid is forced from the cavity 115 to the surrounding environment 160 via the path 117. When the armature 118 is displaced to the right as drawn in FIG. 2, the volume of the cavity 115 increases and venting fluid is drawn into the cavity 115.

A magnet 148 (FIG. 1) is fixedly disposed within the case 150 adjacent to the vent path 152. The magnet 148 may be formed from any magnetic material suitable for attracting contaminants in the form of ferrous particles. The source of the ferrous particles may be external to the solenoid 100 and carried to the solenoid 100 in the venting fluid. Some of the ferrous particles may be generated in the solenoid as solenoid components wear and then carried towards the surrounding environment in the venting fluid. The magnet 148 is disposed sufficiently close to, or within, the flow of the venting fluid so the magnet 148 will attract the ferrous contaminants carried in the fluid flowing in either direction. The magnet 148 has sufficient magnetic strength to prevent reintroduction of the ferrous particles to the venting fluid.

The magnet 148 may advantageously attract and capture ferrous contaminating particles in the venting stream from flowing into the solenoid 100, potentially interfering with movement of the armature. The magnet 148 may also advantageously attract and capture ferrous particles formed within the solenoid 100 caused by friction and wear of moving components. Thus, the magnet limits the introduction of ferrous contaminants to the venting fluid.

Thus a solenoid with a vent path having improved filtering capabilities is provided herein. The disclosed solenoid advantageously eliminates, or substantially reduces ferrous contamination in the vent stream of an electrohydraulic solenoid. Accordingly, the disclosed solenoid may advantageously eliminate, or substantially reduce, ferrous contaminants in a venting fluid thereby improving the performance of an electrohydraulic solenoid.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An electrohydraulic solenoid comprising:
   a hollow cylindrical bobbin having a flange at a first end;
   a core defining a cavity having an open end, the core at least partially disposed in the hollow of the bobbin;
   an armature disposed within the cavity and supported for axial movement within the cavity; and
   a pole piece having a portion disposed in the hollow of the bobbin at the first end with an axial face of the portion abutting the open end of the cavity and a shoulder axially spaced from the flange forming a gap;
   wherein a vent path is formed between the cavity and an outer environment, the vent path comprising at least a portion of the gap, with a magnet disposed in a portion of the vent path and at least partially overlaps with the flange at the first end of the bobbin in an axial plane.

2. The solenoid of claim 1, wherein the gap is maintained by a projection formed on an axial face of the flange abutting an opposing face of the shoulder.

3. The solenoid of claim 2, wherein the projection is a spiral projection to form a tortuous path.

4. The solenoid of claim 1, further comprising:
   a pin having a uniform diameter stem with a uniform diameter and a first end; wherein
   the pole piece defines a centrally located bore having a first diameter at the axial face and extending at least partially through the pole piece and a second diameter, which is smaller than the first diameter, and
   the stem passes through the first diameter and is supported for linear displacement by the second diameter.

5. The solenoid of claim 4, wherein the vent path includes a space between an outer surface of the stem and an inner wall of the first diameter of the centrally located bore.

* * * * *